United States Patent Office 3,580,870
Patented May 25, 1971

3,580,870
BEADED INJECTABLE SEALING COMPOSITION
Robert E. Rosner, Ferguson, Mo., assignor to McDonnell Douglas Corporation, St. Louis County, Mo.
Filed Dec. 6, 1968, Ser. No. 781,796
Int. Cl. C08j 1/14; B01j 13/02
U.S. Cl. 260—2.5    4 Claims

ABSTRACT OF THE DISCLOSURE

A sealant composition including a sealant medium containing specifically sized and shaped particle to improve the completeness of sealing the gaps and spaces that occur between a pair of sealable components due to manufacturing tolerances, the sealant composition being injected under pressure so that said particles are available to fill the gaps and spaces by a clustering formation to block the escape paths of the sealant medium, without interfering with the normal passage provided for distribution of the sealant composition.

---

This invention pertains to improvements in sealants and particularly to the addition of controlled shaped particles to a sealant medium.

It is frequently necessary to seal components of fluid-tight containers by the provision of grooves in one or both of the joined surfaces which are filled with a sealant medium. The sealant medium is usually injected into the groove through one or more of the structural fastening holes under pressure. Due to irregularities and manufacturing tolerances, a large quantity of the presently available injection sealants may be forced out and escape at such gaps or spaces causing waste of the sealant, slowdown of injection time, possible fluid system contamination, and premature repairs of leaks in the structure. Heretofore, in an effort to keep sealant leakage to a minimum, undue time and expense has been required to provide minimal gaps and spaces of a few thousandth of an inch. Structural forms have been compromised to increase the overlap distances between the sealant grooves and the edges of the components so as to increase the resistance to sealant leakage. In some structures, fixed mechanical dams have been required to block sealant leakage.

The objects of this invention are to provide a sealant impregnated with shaped particles to fill the escape avenues between adjacent components of structure, to provide graduated size particles added in predetermined quantities and composition to injectable sealants, to utilize shaped particles which will plug or dam any leakage across the sealant distribution grooves while not interfering with the flow of the sealant during injection, and to provide a sealant with rounded shaped particles improving the sealing characteristics in a unique way.

The invention is exemplified in its application to aircraft fuel tanks that are integral with the airframe structure so that every possible cavity in the aircraft may be utilized for maximum fuel carrying capacity. Other uses will become evident as the invention is set forth in more detail.

The invention is disclosed in the accompanying drawing, wherein.

Figure 1:
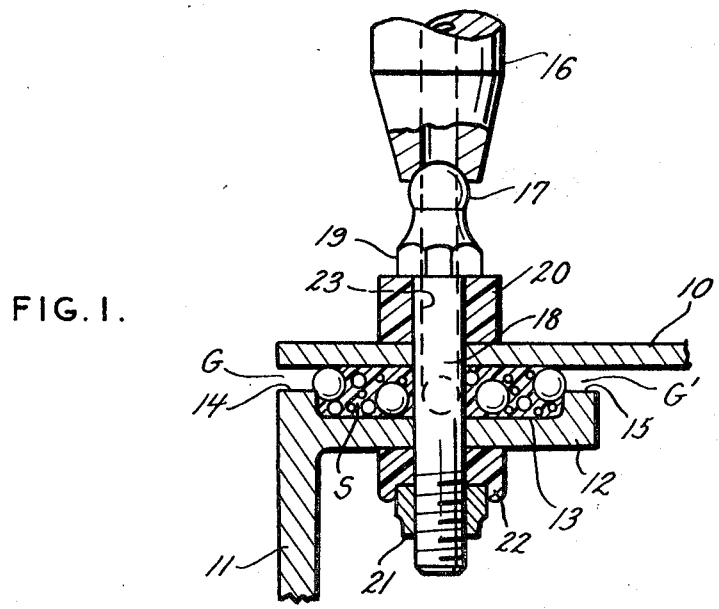
FIG. 1 is a fragmentary sectional elevation of a pair of structural components to be sealed with an injectable sealant containing shaped particles of graduated sizes or shapes.

Referring to the several views of the drawing, in FIG. 1 the skin sheet 10 of a fuel tank is abutted with a wall 11, and the wall is provided with an inwardly extending flange 12 in which a sealant receiving groove 13 is provided. The skin 10 may be the wing covering or fuselage skin and flange 13 may have any desired length, and it is desired to effect a close fit between the skin surface with the lands 14 and 15 of the flange 12 on each side of the groove 13. However, due to irregularities in forming the land surfaces 14 and 15, as well as variations in the skin sheet 10, and matching surfaces do develop gaps or spaces through which presently available injection sealants escape. Escape of the sealant at land 14 is visible at any gap G (see FIG. 1), but the escape of sealant at gap G' is not visible and is in an area where it can contaminate the contents of the tank or enclosed space.

The sealant material S is generally injected at high pressure through an injection gun 16, the nozzle of which is applied to a suitable fitting inlet 17 having an elongated shank 18 extending through a structural fastening aperture. The fitting has its head 19 seated on a spacer 20, and the opposite threaded end of the shank 18 receives a securing nut 21 and a nut retainer 22. The sealant is delivered through the injection passages 23 and passes into and flows lengthwise of the groove 13.

Figure 2:
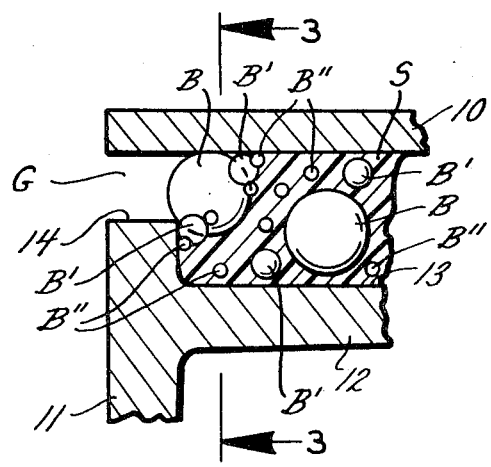
FIG. 2 is a greatly enlarged fragmentary view of the components of FIG. 1 illustrating the sealing action of the shaped particles at a gap between the components.
Figure 3:
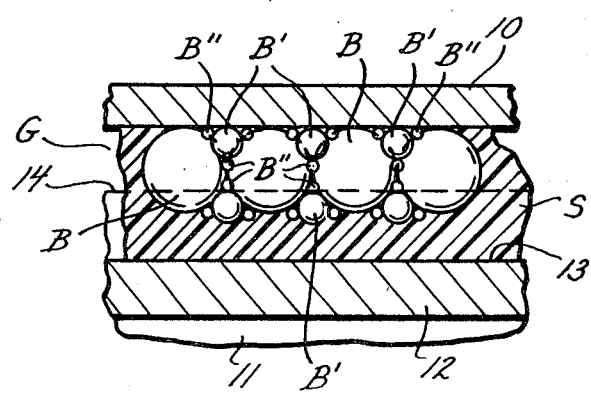
FIG. 3 is a view taken at line 3—3 in FIG. 2.

As can be seen in FIGS. 2 and 3, the sealant S contains a quantity of particles which are graduated in size from large balls B to medium size balls B' to small balls B". As the sealant is injected under pressure at nozzle 16 the flow out of the groove 13 at gaps G and G' is effectively blocked by the particles clustering along the gaps. The larger balls B and smaller balls B' and B" arrange themselves in such random clusters that very small spaces remain and these spaces offer such high resistance to the sealant that leakage is effectively blocked. While balls have been illustrated, other rounded discrete shapes may be resorted to in order to build up a cluster at any gap G or G' in which the particles are arranged in close order to reduce the gaps to such small passages that the sealant material is prevented from escaping.

An example of a suitable sealant S consists of 85 percent of a fluorosilicone type of injection sealant, 9 percent of .0138 to .0331 inch diameter plastic micro-balls B, 4 percent of .0059 to .0117 inch plastic micro-balls B', and 2 percent of .0018 to .0029 inch diameter plastic micro-balls B". The balls are formed from polystyrene cross polymerized with 8% to 12% divinyl benzene.

The injectable sealant medium herein presently preferred is fluorosilicone, but other sealant medium may be satisfactory when possessed of the following characteristics: such a medium must have a viscosity consistency substantially that of a gun grade putty or caulking compound, must remain pliable or pliable and tacky for its life, must not heat or air harden or cure, must in the case of fluorosilicone types have a substantially flat viscosity curve over a temperature range of from minus 65° F. to plus 400° F., must be inert to or be highly resistant to hydrocarbons, and must be substantially unaffected by shock, vibration and thermal cycling conditions in service. The presently preferred sealant impregnated with the specified discrete particles is commercially obtainable from Dow Corning, Division of Dow Chemical, Midland, Mich. and is identified as sealant Q 94-031.

Depending on the conditions of use, the sealant medium may vary between as little as about 70% to as much as 90% by volume of the total composition of sealant medium and discrete particles. In the lower quantities of sealant medium it is preferred to increase the volume of larger particles somewhat more than the lesser sized particles so that a seal at a gap may be established more rapidly. It has been noted above that a highly satisfactory composition may comprise 85% by volume of the sealant medium and 15% by volume of a mixture of discrete particles of which the larger particles make up the largest proportion of the 15%.

Such a sealant composition containing the specified quantities of said plastic micro-balls has been found to stop sealant leakage in gaps G and G' of up to .025 inch, or gaps slightly smaller than the larger balls. This sealant greatly reduced the injection time, and improved the fluid sealing ability of the structure. The reduced injection time resulted from the increased flow rate due to the micro-balls, and this is attributed to the ability of the discrete particles B, B' and B'' to lower the internal laminar flow resistance of the fluorosilicone. As before noted, the micro-balls build up a dam at the manufacturing gaps G and G' by the packing and clustering action of the graduated sizes of the micro-balls. The larger particles are stopped at the gap and the continued effort of the sealant to flow around the larger balls brings the lesser sized balls into action to cluster and accumulate so as to reduce the leakage gaps to a size that the viscous sealant cannot pass because the smaller particles substantially fill up the spaces around the larger particles (as seen in FIG. 3) to the extent that the viscosity of the sealant medium prevents escape.

The sealant example recited above has the advantages over the unbeaded sealant of being able to seal gaps up to 300–400 percent larger than before, to reduce the cost of manufacture of structural components requiring sealants, to increase the rate of injection, to reduce the quantity of sealant needed due to the addition of the micro-balls, to reduce the manufacturing cost of sealant, to lower the weight of sealant by up to about 4 percent as the plastic is a light weight material compared to the fluorosilicone it replaces, and to improve leakage resistance due to vibration effects. Because of the reduction possible in faying surface lands 14 and 15 adjacent the groove 13, a significant weight saving can be realized in structural configurations by relying on minimum fastener edge distances. Because of the gap insensitivity of the improved sealant, greater fastener spacing can be used without concern for the resultant bending between fasteners during injection and this advantage will reduce leakage, weight, cost of structures and assembly time. Since the improved sealant possesses gap leakage insensitivity it will allow the use of higher strength materials such as titanium which are difficult or impractical to rework during assembly to maintain present gap limits of .005 inch.

Another example of a sealant material comprises a gun grade of polysulfiide sealant material commercially obtainable from Product Research and designated PR–701M. Discrete particles formed from Lexan, a polycarbonate plastic material of General Electric, may be combined with the polysulfide to result in a beaded injectable sealant. Except for its loss of viscosity near about 200° F., polysulfide is an acceptable material for the purposes of effecting a seal between two parts. Discrete particles formed from the Lexan plastic material may be used in the fluorosilicone sealant material.

In the foregoing description it is important to understand that the particle size is critical to the effective sealing of gaps up to the maximum sized discrete particles injected with the sealant S. The discrete particles can be in the form of balls, spheres or beads, and these can be either solid or hollow. The polystyrene plastic has been set forth, however other materials such as glass, various plastic compounds, ceramics or metal of graduated sizes may also be employed. In general, the discrete particles are to be substantially inert to the sealant medium and to the contents to be sealed in. As used herein and in the claims, the term "beaded injectable sealant" is intended to encompass a flowable carrier medium impregnated with discrete particles of such shape as to lower the internal laminar flow resistance of the carrier medium. Where there is flexing or movement between the adjacent surfaces of members 10 and 11, it is generally desirable to employ discrete particles made of material softer than the members in order to avoid abrading the adjacent surfaces.

The drawing has illustrated a structure in which the improved beaded injectable sealant may be used, and no attempt has been made to illustrate various other adaptations and uses as it is believed that this disclosure will enable those skilled in the art to make and use the present invention in the widely varying applications for which it is adapted.

What is claimed is:

1. An injectable sealant composition impregnated with varying sizes of shaped particles which cluster and fill the gap spaces between adjacent structural components, said sealant being composed of about 85% by volume of an injectable viscous and flowable medium (a flowable liquid sealant) and the remainder consisting of about 9% micro-balls varying in diameter from .0138 to .0331 inch, about 4% micro-balls varying in diameter from .0059 to .0117 inch, and about 2% micro-balls varying in diameter from .0018 to .0029 inch, said sealant medium carrying said micro-balls into the gap spaces where clustering occurs to reduce the gap space to a size such that the viscous medium is prevented from passing through to the exterior.

2. The sealant composition of claim 1 wherein said micro-balls are substantially inert to said injectable medium and are formed of a material that is softer than the surfaces of the gap space between the structural components.

3. The sealant composition of claim 1 wherein said injectable medium is a gun grade of polysulfide and said micro-balls are formed from polycarbonate plastic material.

4. The sealant of claim 1 wherein said [discrete particles] micro-balls are formed of polystyrene cross polymerized with 8% to 12% divinyl benzene.

References Cited

UNITED STATES PATENTS

| 2,325,726 | 8/1943 | Acker | 106—33 |
| 2,856,301 | 10/1958 | Badger et al. | 106—33 |
| 2,140,672 | 12/1938 | Gray et al. | 220—81 |
| 3,042,098 | 7/1962 | Reinowski et al. | 152—347 |

SAMUEL H. BLECH, Primary Examiner

U.S. Cl. X.R.

106—33; 220—81R; 260—2.5R, 824R, 827, 860, 886